(12) United States Patent
Zhong et al.

(10) Patent No.: US 9,436,930 B2
(45) Date of Patent: Sep. 6, 2016

(54) METHOD AND APPARATUS FOR RECOGNIZING IMAGE CONTENT

(71) Applicant: EMC Corporation, Hopkinton, MA (US)

(72) Inventors: Qianjie Zhong, Shanghai (CN); Feng Guo, Shanghai (CN); Qiyan Chen, Shanghai (CN); Chao Chen, Shanghai (CN); Bo Chen, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 102 days.

(21) Appl. No.: 14/089,909

(22) Filed: Nov. 26, 2013

(65) Prior Publication Data
US 2014/0150057 A1 May 29, 2014

(30) Foreign Application Priority Data
Nov. 28, 2012 (CN) .......................... 2012 1 0519142

(51) Int. Cl.
*G06F 21/36* (2013.01)
*H04L 9/32* (2006.01)
*G06Q 10/10* (2012.01)

(52) U.S. Cl.
CPC .............. *G06Q 10/10* (2013.01); *G06F 21/36* (2013.01)

(58) Field of Classification Search
CPC ....... G06Q 10/10; G06F 21/00; G06F 21/30; G06F 21/306; G06F 21/31; G06F 21/36; H04L 63/08
USPC ................. 455/410, 411; 713/182–186, 168; 726/2–7, 28; 705/67, 75
See application file for complete search history.

(56) References Cited

U.S. PATENT DOCUMENTS

| | | | | |
|---|---|---|---|---|
| 8,370,926 | B1* | 2/2013 | Satish | G06F 21/36 380/270 |
| 8,413,220 | B1* | 4/2013 | Quinn | G06F 21/36 709/225 |
| 2007/0043681 | A1* | 2/2007 | Morgan et al. | 705/67 |
| 2008/0126478 | A1* | 5/2008 | Ferguson et al. | 709/203 |
| 2008/0189768 | A1* | 8/2008 | Callahan et al. | 726/4 |
| 2010/0095350 | A1* | 4/2010 | Lazar et al. | 726/3 |
| 2011/0208716 | A1* | 8/2011 | Liu et al. | 707/710 |
| 2013/0145441 | A1* | 6/2013 | Mujumdar | G06F 21/305 726/5 |
| 2013/0330693 | A1* | 12/2013 | Sada et al. | 434/236 |
| 2014/0041005 | A1* | 2/2014 | He | 726/7 |

* cited by examiner

*Primary Examiner* — Shanto M Abedin
(74) *Attorney, Agent, or Firm* — Krishnendu Gupta; Konrad R. Lee

(57) ABSTRACT

Embodiments of the present invention provide a method and apparatus for recognizing image contents. In one embodiment of the present invention, there is provided a method for recognizing image contents, comprising: providing at least a first image pair and a second image pair to a user; obtaining a first answer and a second answer from the user, wherein the first answer and the second answer respectively indicate the user's determination on whether the image contents in the first image pair and the second image pair are same or not; and modifying a weight of the second image pair in response to the first answer matching a predetermined answer. In one embodiment of the present invention, there is provided an apparatus for recognizing image contents.

8 Claims, 7 Drawing Sheets

300

Please determine whether image contents are same:

| 310 Image A-1 | 312 Image A-2 | ☐ Same |

| 320 Image B-1 | 322 Image B-2 | ☐ Same |

332 Login    334 Cancel

| 610A Image Node | | |
|---|---|---|
| 612A Image ID | 614A Image Attribute | 616A Image |

| 610B Image Pair Node | | |
|---|---|---|
| 612B First Image ID | 614B Second Image ID | 616B Weight |

Fig. 6B

METHOD AND APPARATUS FOR RECOGNIZING IMAGE CONTENT

FIELD

Embodiments of the present invention relate to image recognition, and more specifically, to a method and apparatus for recognizing image contents by using collective intelligence.

BACKGROUND

For a long time, image recognition has been one of research focuses in the field of digital image technology. At present, an algorithm of recognizing various image contents has been developed. However, a problem in recognizing image contents lies in that due to interferences from the shooting angle, light condition, or jitter, etc., the image recognition algorithm is not always able to get a desired result. In addition, for example, when an object in an image is a person growing with age (or an article gradually worn out with daily use), the image recognition algorithm may not be able to correctly recognize images (e.g. photos of a same character respectively taken in three years old and ten years old) taken in different time for the same object.

In the aspect of recognizing image contents, human beings are keen on observation and judgment. However, the current computer cannot completely simulate the processing ability of human brain for information such as image. For example, when judging whether the contents of two images are for the same characters/things, the human eye and brain often can get some details of the images, or compare the images on the whole so as to find the similarity in the images even when the shooting angle, light and shooting years of the two images are different, and to further draw a conclusion that the two images are taken for the same characters/things. Therefore, it is expected to introduce the special wisdom of mankind into image recognition technology.

In addition, the development of personal computing equipment (including e.g. stationary and mobile computing equipment) provides massive computing power to ordinary users. Furthermore, with the development of network technology, the ability of a personal computing equipment in data communication has been increasingly enhanced, which can access various resources it needs almost at any time through the network. Currently, an application has evolved, which may use the processing ability of a networked personal computing equipment when the computing equipment is in an idle state. Applications supporting functions such as "cloud computing" and "cloud processing" have been gradually developed. The development of the personal computing equipment and network technology provides hardware possibility for calling collective intelligence of public audience by the personal computing equipment to facilitate the image recognition.

SUMMARY

Therefore, it is desired to develop a technical solution of assisting image recognition based on collective intelligence of public audience, and it is desired that this technical solution may not interfere with an ordinary user's normal use experience for personal computing equipment as much as possible, and may achieve the object of assisting image recognition by using collective intelligence of public audience in the case of causing extra labor of the user as little as possible.

In one embodiment of the present invention, there is provided a method for recognizing image contents, comprising: providing at least a first image pair and a second image pair to a user; obtaining a first answer and a second answer from the user, wherein the first answer and the second answer respectively indicate the user's determination on whether the image contents in the first image pair and the second image pair are same or not; and modifying a weight of the second image pair in response to the first answer matching a predetermined answer.

In one embodiment of the present invention, there is further comprised: determining the image contents in the second image pair being same in response to the weight of the second image pair reaching a predetermined weight.

In one embodiment of the present invention, the first image pair is selected from a first database that stores image pairs, in which whether the image contents are same or not is known; and the second image pair is selected from a second database that stores image pairs, in which whether the image contents are same or not is unknown.

In one embodiment of the present invention, there is provided an apparatus for recognizing image contents, comprising: a providing module configured to provide at least a first image pair and a second image pair to a user; an obtaining module configured to obtain a first answer and a second answer from the user, wherein the first answer and the second answer respectively indicate the user's determination on whether the image contents in the first image pair and the second image pair are same or not; and a modifying module configured to modify a weight of the second image pair in response to the first answer matching a predetermined answer.

In one embodiment of the present invention, there is further comprised: a determining module configured to determine the image contents in the second image pair being same in response to the weight of the second image pair reaching a predetermined weight.

In one embodiment of the present invention, the first image pair is selected from a first database that stores image pairs, in which whether the image contents are same or not is known; and the second image pair is selected from a second database that stores image pairs, in which whether the image contents are same or not is unknown.

By means of the method and apparatus provided by embodiments of the present invention, image pairs may be provided to the user via personal computing equipment; the user's determination on whether the image contents in the image pairs are same or not may be obtained; and then image recognition may be assisted based on the determination from public audience. Further, when the verification code function is implemented, the image contents may be recognized based on the collective intelligence by using the solution of providing image pairs and obtaining determination results to replace the verification code solution for security login in the prior art.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated in a schematic instead of a limited manner. In the drawings:

FIG. 3 schematically illustrates a schematic view of a user interface according to one embodiment of the present invention;

FIGS. 6A and 6B schematically illustrate a schematic view of data structures of image nodes and image pair nodes according to one embodiment of the present invention, respectively.

DETAILED DESCRIPTION

Figure 1:
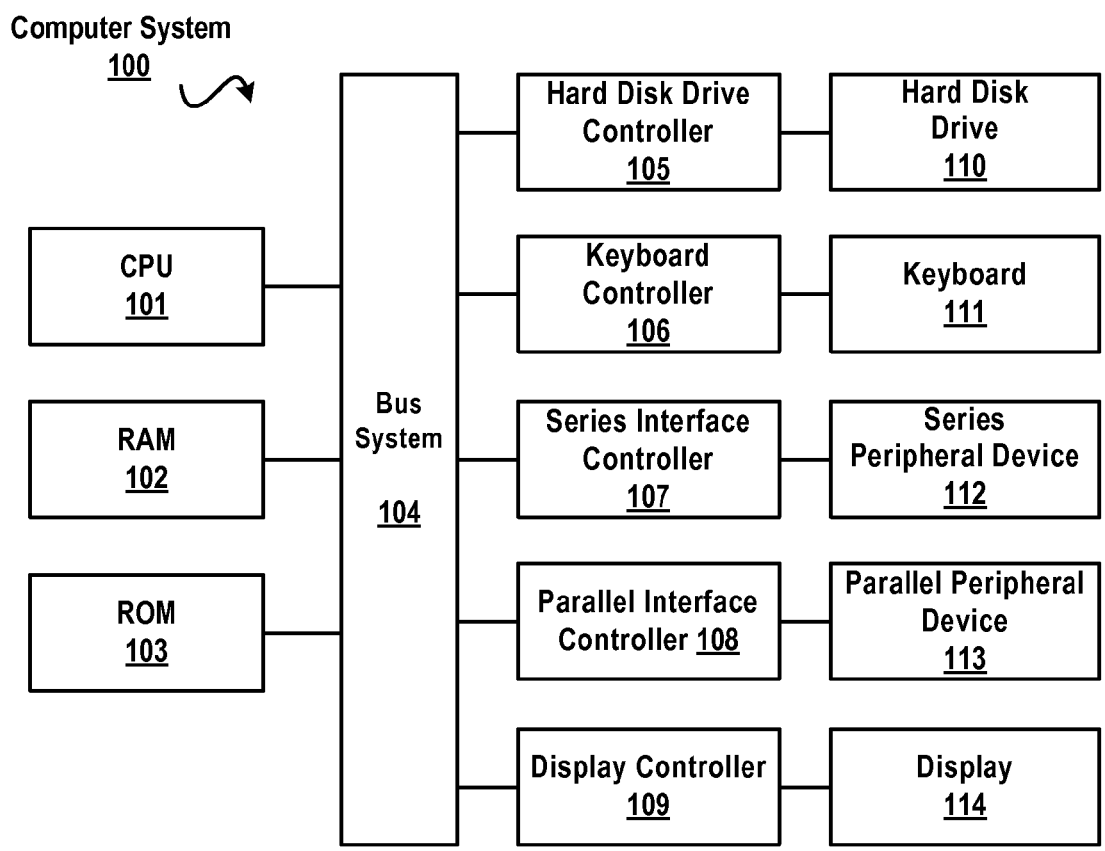
FIG. 1 schematically illustrates a block diagram of an exemplary computer system which is applicable to implement the embodiments of the present invention.

It should be noted that recognizing image contents as described in the context of the present invention refers to recognizing whether objects in two images are same characters or things. For example, image A contains a three-year-old child's front face while image B contains a ten-year-old child's side bust. Although the pixel contents of the two images are not same, since the two images are photos taken in different ages for the same child, it should be regarded that the contents of image A and image B are same. For another example, the appearance of the same article in different states may change greatly (e.g. one image contains an open umbrella while another image contains a closed umbrella), and thus it is hard to recognize the similarity between the contents in the two images by purely employing the digital image processing technology. However, the human eye can easily determine whether the umbrellas in the two images are same or not via the color, pattern, etc. of the umbrellas.

Recognizing whether the image contents are same or not may be applied in wide range with a great significance. Currently, the social practice includes various situations in which it needs to determine whether the image contents are same or not. For example, when losing an article, the owner may post a Lost including the picture of the lost article and the owner's contact information in a Lost and Found Forum; and on the other hand, the staff of the forum will regularly update the picture list of the found articles in the forum. However, since the owner may not check the articles in the picture list one by one, he/she might not find that his/her own lost article has been sent to the Lost and Found. At that time, if whether the lost article and the found article are same or not can be recognized, the loser may be informed as soon as possible.

In addition, at present, there already exist mechanisms dedicated to helping lost children's parents to look for their lost children, and these mechanisms have many lost children's photos provided by their parents and street children's photos taken by ordinary people. It needs the aid of image content recognition in look for connections between the two types of photos. In addition, the image content recognition is also beneficial to searching for the wanted men, looking for the lost pets, etc. It should be noted that in embodiments of the present invention, it is regarded that the contents and sources of all images are legal; no private information exists in the images; and the use of image information does not violate the law of the state/region where the technical solution of the present invention is used.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
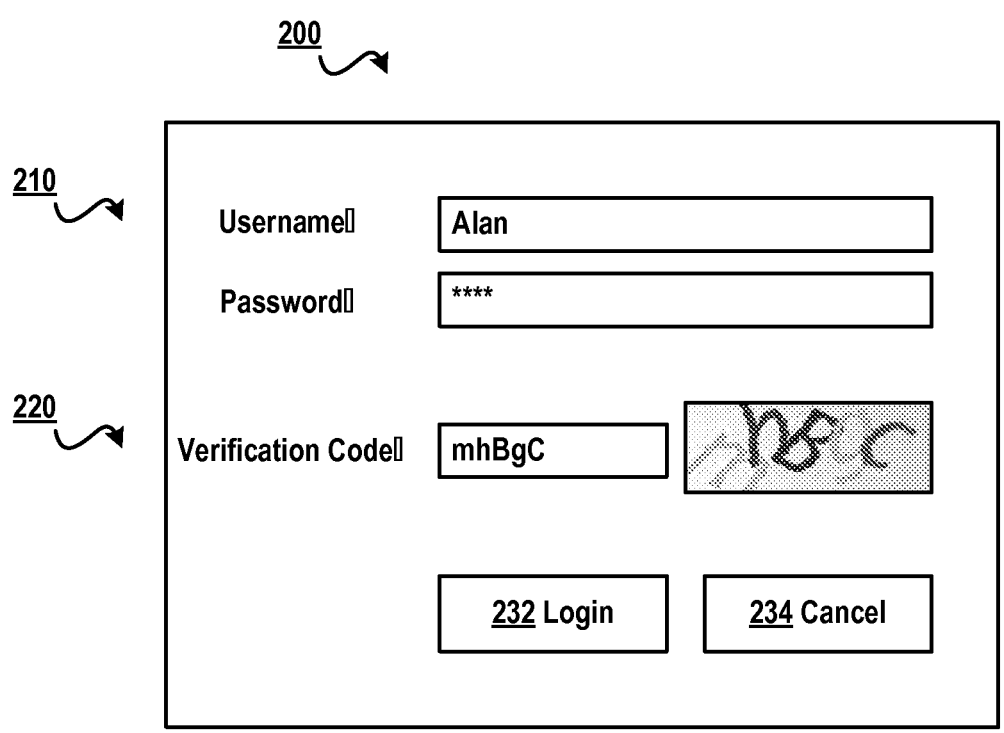
FIG. 2 schematically illustrates a schematic view of a user login interface according to a solution.

FIG. 2 schematically illustrates a schematic view of a user login interface 200 according to a solution. The login interface 200 comprises: a login information portion 210 such as user name "Alan" and password "****"; a verification code portion 220, which for example may include a textbox for inputting a verification code and an image for displaying the verification code; a login button 232 and a cancel button 234.

A user is required to provide a verification code in the login interface, which may more effectively prevent the situation of account take-over by an exhaustive test method by an malicious application, etc. Currently, many main websites have employed the technical solution of improving security via a verification code, and a large number of users have approved to take providing a verification code as a portion of a login into a website. Based on the solution of providing a verification code in a web site, the present invention provides a technical solution of collecting a user's determination on image contents while the user browses the webpage, to further assist in recognizing image contents.

FIG. 3 schematically illustrates a schematic view of a user interface 300 according to one embodiment of the present invention. For example, a user interface similar to that illustrated in FIG. 3 may be provided to a user while the user browses the webpage. It should be noted that here, it is not limited that the user interface is provided only when the user has access to the login interface, and the user interface may also be provided before or after the user login, without affecting the user experience. At this time, although the interface loses the function of replacing the verification code in the existing login interface to improve security, a user's determination on image contents may be collected via this user interface to further achieve the object of recognizing images using collective intelligence.

As illustrated in FIG. 3, a user may be provided with two image pairs, e.g. a first image pair (including image A-1 310 and image A-2 312 above the dashed line) and a second image pair (including image B-1 320 and image B-2 322 below the dashed line), and the user is prompted to input a determination of whether the image contents for each image pair are same or not, for example, via a check box. For example, when a user deems that two images in an image pair are images for the same characters/things, the user may select the check box; otherwise, the user may select nothing. By this means, the user may achieve input merely by only clicking the mouse, rather than using the keyboard to input a verification code just like the prior art, thereby avoiding much inconvenience caused by switching between the mouse and the keyboard.

In this embodiment, in order to achieve the object of the verification code while collecting a user's determination on the contents of the image pair, the user may be provided with an image pair, wherein whether the image pair matches is known, and another image pair, wherein whether the image pair matches is unknown. Based on the image pair, wherein whether the image pair matches is known, the known matching situation may be compared with the answer (e.g. "same" or "different" input via the check box) collected from the user; if the matching situation is consistent with the collected answer, it is regarded that the user inputs the correct "verification code"; otherwise, it is regarded that the user inputs a wrong "verification code." Based on the image pair, wherein whether the image pair matches is unknown, the answer collected from the user may be used as a basis for recognizing image contents so as to achieve the object of utilizing collective intelligence.

In one embodiment of the present invention, there is provided a method for recognizing image contents, comprising: providing at least a first image pair and a second image pair to a user; obtaining a first answer and a second answer from the user, wherein the first answer and the second answer respectively indicate the user's determination on whether the image contents in the first image pair and the second image pair are same or not; and modifying a weight of the second image pair in response to the first answer matching a predetermined answer.

In this embodiment, the weight of the image pair is a value used to describe whether the contents of two images in the image pair are same or not. In other words, it is a value used to describe the possibility that the contents of two images in the image pair are same. The weight, for example, may be expressed by employing a real number between 0 and 1, where 0 indicates that the contents of the two images are different while 1 indicates that the contents of the two images are same.

Figure 4:
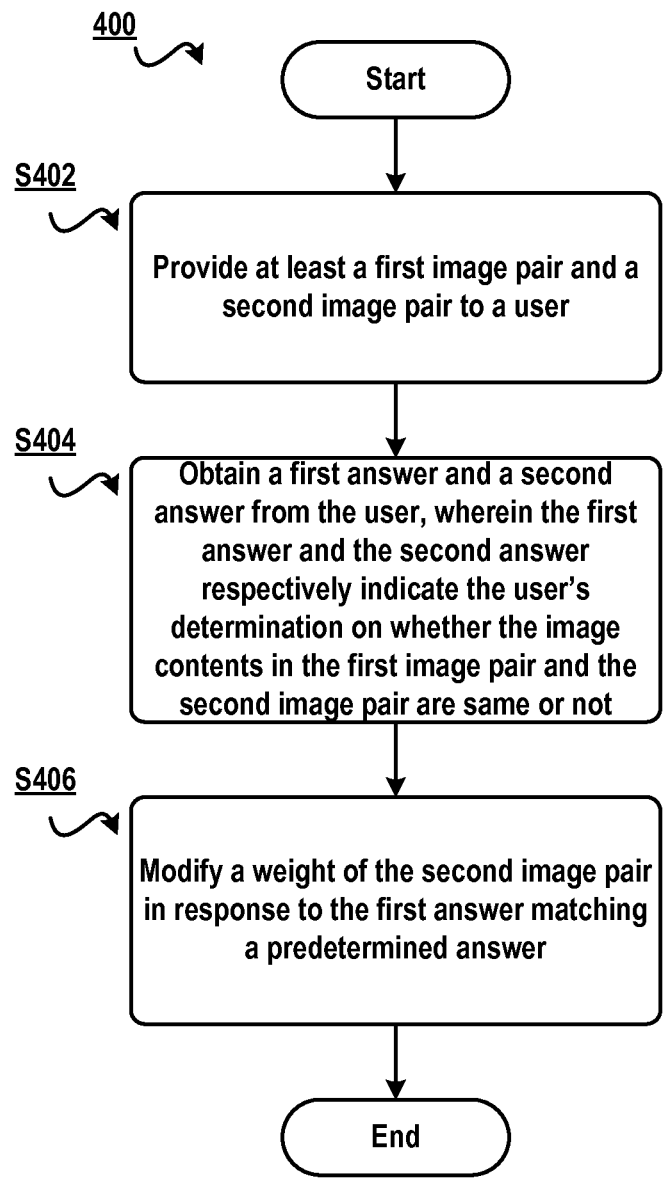
FIG. 4 schematically illustrates a flowchart of a method for recognizing image contents according to one embodiment of the present invention.

Specifically, FIG. 4 schematically illustrates a flowchart 400 of a method for recognizing image contents according to one embodiment of the present invention. In step S402, a user is provided with at least a first image pair and a second image pair. For example, the interface as illustrated in FIG. 3 may be employed to provide two image pairs to the user. Alternatively, the user may be provided with more than two image pairs, for example, three image pairs. And those skilled in the art may design other interfaces for providing image pairs based on the interface illustrated in FIG. 3.

In step S404, a first answer and a second answer are obtained from the user, wherein the first answer and the second answer respectively indicate the user's determination on whether the image contents in the first image pair and the second image pair are same or not. To facilitate user operation, the check box illustrated in FIG. 3 may be employed to receive answers from the user. At this moment, a user input may be obtained with only two clicks at most (when it is deemed that the contents in two image pairs are all same), or with no click at all (when it is deemed that the contents in two image pairs are all different). Alternatively, those skilled in the art may also arrange a set of radio buttons including "same" and "different" to receive answers from the user. In an example of providing three image pairs to the user, it is necessary to obtain from the user answers for the three image pairs.

In step S406, a weight of the second image pair is modified in response to the first answer matching a predetermined answer. It should be noted that in this embodiment, the function of the first image pair is similar to that of the verification code; when the first answer matches a predetermined answer, it represents that a user's determination on consistency of image contents is correct; on the other hand, it represents that the user's recognition ability for image contents is trustworthy, and/or the user inputs his/her answer after a serious discrimination rather than at random, and thus the second answer given by the user for the second image pair may be trustworthy to some extent. In the example of providing three image pairs to the user, weights of the second image pair and third image pair may also be modified in response to the first answer matching a predetermined answer.

In one embodiment of the present invention, a weight may be set for each image pair, and the initial value of the weight may be set as 0. When believing that the contents of two images in the image pair are same, the user may increase the weight by one value, or may set the weight as a ratio of the number of users selected "same" to the number of all users participating in recognizing. In subsequent steps, whether the contents of two images in the image pair are same or not is determined by measuring the size of the weight.

In one embodiment of the present invention, there is further comprised: determining the image contents in the second image pair being same in response to the weight of the second image pair reaching a predetermined weight. For example, when the ratio is taken as the weight, a "same" recognition result is outputted when 80% users believe that the image contents in the second image pair are same. In this embodiment, it may further be defined how many users' answers need to be obtained. For example, 1000 users' answers may be collected and when 80% of the 1000 users give a "same" recognition result, the contents of two images are believed to be same.

It should be noted that other steps after this step may be employed to further verify the correctness of the recognition result. For example, an image recognition algorithm may be employed for processing, and an expert on face recognition technology, for example, may further be requested to make a further determination, to further eliminate some errors appearing in the image recognition scheme according to the embodiments of the present invention.

In one embodiment of the present invention, the first image pair is selected from a first database that stores image pairs, in which whether the image contents are same or not is known; and the second image pair is selected from a second database that stores image pairs, in which whether the image contents are same or not is unknown. In this embodiment, the first database and the second database are respectively set for storing image pairs in which whether the image contents are same or not is known or unknown. The object for providing the first image pair from the first database lies in providing an image pair similar to the verification code, and when the first answer from the user matches a predetermined answer, it is believed that the user's answer to the second image pair is valid.

It should be noted that in embodiments of the present invention, the first image pair and the second image pair may be selected randomly and respectively from the first database and the second database. The images in the image pair included in the first database may be different from each other, or may be somewhat overlapped. For example, one image pair in the first database includes image A and image B, while another image pair includes image B and image C. Similarly, the image pairs included in the second database may either be different from each other or somewhat overlapped.

For example, when one image pair in the second database includes image A and image B, while another image pair includes image B and image C, if the weights for image pair (A, B) and (B, C) respectively exceed a predetermined threshold, then it may be deemed that the contents of image A and image C are also the same in the case that no image pair (A, C) is provided to the user. If image pairs (A, B), (B, C) and (A, C) are respectively provided to the user, and the weights of the three image pairs are greatly different from each other, then other additional verification processing may also be executed to image A, image B and image C.

In one embodiment of the present invention, the first image pair and the second image pair are displayed at random. The purpose for random display lies in that the user should treat the two image pairs seriously. If the user has learned that the first image pair is displayed first while the second image pair is displayed later, and the user only needs to give a correct answer to the first image pair, then such a case may occur that the user only carefully distinguishes images in the first image pair while randomly provides an answer to the second image pair, which may possibly reduce the accuracy of the answers collected from the user. In this embodiment, since the first image pair and the second image pair are displayed at random, a user must carefully analyze the contents of two image pairs and respectively give an answer; otherwise, the user may not enter the expected page, for example, cannot login, due to giving a wrong answer to the first image pair.

In one embodiment of the present invention, providing at least a first image pair and a second image pair to a user comprises: providing at least a first image pair and a second image pair to a user in response to the user accessing the login page. When a user has access to the login page, the first image pair and the second image pair according to the present invention are used to replace the verification code in the prior art. Specifically, the interface illustrated in FIG. 3 may be utilized, for example, to replace the verification code portion 220 in the login interface illustrated in FIG. 2 so as to implement the method according to the present invention.

In this embodiment, the function of the first image pair corresponds to the verification code in the prior art, while the function of the second image pair lies in providing the user with two images to be recognized, and obtaining, via interaction with the user, the user's determination on whether the contents of the two images in the second image pair are same or not. In this way, a determination result matching the recognition ability of the general public can be obtained by collecting determination results from a large number of users.

In one embodiment of the present invention, a user is directed to another page associated with the login page in response to the first answer matching the predetermined answer. In one embodiment of the present invention, the method as illustrated in FIG. 4 in the preceding text is executed again in response to the first answer not matching the predetermined answer. In this embodiment, as long as the user's first answer to the first image pair matches the predetermined answer, the user is allowed to login and the weight of the second image pair is modified based on the user's second answer. In addition, when the user's first answer to the first image pair does not match the predetermined answer, a pair of another two images may again be provided to the user as the first image pair. In one embodiment of the present invention, when a certain number (ratio) of users' answers to certain specific first image pair are wrong, it may be deemed that the consistency of the image contents in the first image pair is not obvious enough, and thus the first image pair is deleted from the first database for being unfit as a "verification code."

In one embodiment of the present invention, the method is provided independent of the login page. Although the method for recognizing images has been described with reference to the login interface in the preceding text, the implementation of this method may be independent of the login interface, for example, the method may be provided by a third party mechanism different from the login website provider. Furthermore, the first database and the second database may also be provided by an independent mechanism. For example, entities such as the Lost and Found Forum, the police office, etc., may be used to provide the first database and the second database, or merely provide the second database in which the image pair to be recognized is stored.

In this embodiment, the website provider only needs to embed a small amount of codes in the login interface to call the application of the method for recognizing image contents according to the present invention. In this way, the website provider may transfer development and maintenance of the "verification code" function to another providing party, and may also utilize collective intelligence to recognize image contents, without additionally consuming too much time and energy from the user.

In one embodiment of the present invention, the second image pair is removed from a second database in response to the weight of the second image pair reaching the predetermined weight. When it is determined that the image contents of the second image pair are same, it is unnecessary to provide the second image pair to other users, and thus the second image pair can be removed from the second database or can be moved to the first database.

In one embodiment of the present invention, the image contents are any of articles, animals and figures. In embodiments of the present invention, the scope of image contents is not limited and the image contents may include article images (e.g. for lost and found), animal images (e.g. for looking for the lost pet) or figures/faces (e.g. for searching the wanted men or for looking for the lost children, etc.).

Figure 5:
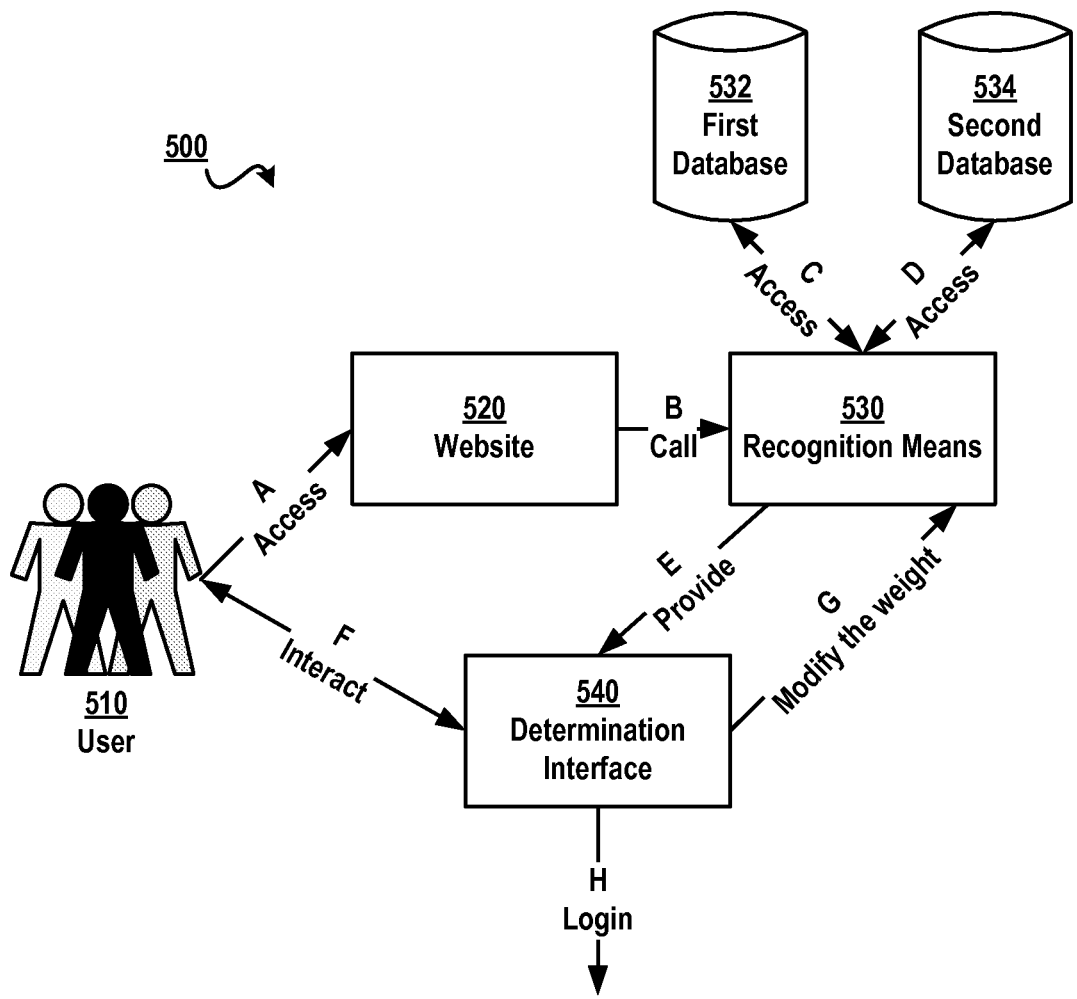
FIG. 5 schematically illustrates an architectural view of a system for recognizing image contents according to one embodiment of the present invention.

FIG. 5 schematically illustrates an architectural view 500 of a system for recognizing image contents according to one embodiment of the present invention. Specifically, in response to user 510's access to website 520 (as illustrated by arrow A), the website 520 may call recognition means 530 (as illustrated by arrow B, by calling, for example, the application providing the function of the present invention). Then, the recognition means 530 respectively has access to the first database 532 and the second database 534 (as illustrated respectively by arrows C and D), and respectively reads a first image pair and a second image pair therefrom, and then provides the aforesaid two image pairs in a determination interface 540. The user 510 inputs an answer to two image pairs via interaction with the determination interface (as illustrated by arrow F). When the user 510's answer to the first image pair matches a predetermined answer, the weight (as illustrated by arrow G) for the second image pair can be modified based on the second answer, and the user is allowed to login (as illustrated by arrow H).

FIGS. 6A and 6B schematically illustrate schematic views 600A and 600B of data structures according to one embodiment of the present invention, respectively. In the data structure 600A, image node 610A includes: an image ID 612A configured to uniquely define an identifier of each image; image attribute 614*a* configured to define various information associated with the image (e.g. when the image is a lost child's photo, it may include the name, birth date and lost time of the child, and the contact information of the child's parents, etc.); and image 616A configured to store pixel information of the image. In the data structure 600B, image pair node 610B includes: a first image ID 612B, a second image ID 614B, and a weight 616B indicating the possibility that the contents of the first image and the second image are same.

Figure 7:
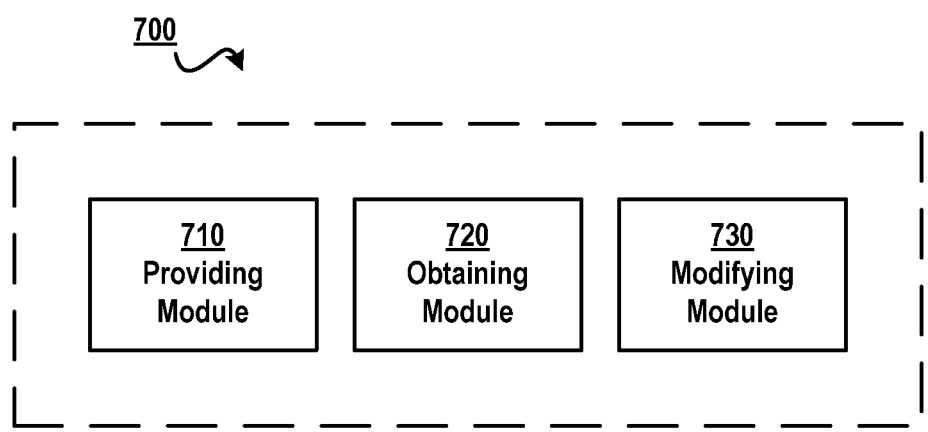
FIG. 7 schematically illustrates a block diagram of an apparatus for recognizing image contents according to one embodiment of the present invention.

FIG. 7 schematically illustrates a block diagram of an apparatus for recognizing image contents according to one embodiment of the present invention. Specifically, there is provided an apparatus for recognizing image contents, comprising: a providing module 710 configured to provide at least a first image pair and a second image pair to a user; an obtaining module 720 configured to obtain a first answer and a second answer from the user, wherein the first answer and the second answer respectively indicate the user's determination on whether the image contents in the first image pair and the second image pair are same or not; and a modifying module 730 configured to modify a weight of the second image pair in response to the first answer matching a predetermined answer.

In one embodiment of the present invention, there is further comprised: a determining module configured to determine the image contents in the second image pair being same in response to the weight of the second image pair reaching a predetermined weight.

In one embodiment of the present invention, the first image pair is selected from a first database that stores image pairs, in which whether the image contents are same or not is known; and the second image pair is selected from a second database that stores image pairs, in which whether the image contents are same or not is unknown.

In one embodiment of the present invention, the providing module comprises: a login module configured to provide at least the first image pair and the second image pair to the user in response to the user accessing a login page.

In one embodiment of the present invention, there is further comprised: a first directing module configured to direct the user to another page associated with the login page in response to the first answer matching the predetermined answer.

In one embodiment of the present invention, there is further comprised: a second directing module configured to again call the aforesaid apparatus for recognizing image contents in response to the first answer not matching the predetermined answer.

In one embodiment of the present invention, the apparatus is provided independent of the login page.

In one embodiment of the present invention, the first image pair and the second image pair are displayed at random.

In one embodiment of the present invention, there is further comprised: a removing module configured to remove the second image pair from a second database.

In one embodiment of the present invention, the image contents are any of articles, animals and figures.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method-for recognizing-images, wherein the images are stored within a database which includes pairs of images that are same or unknown, comprising:
  storing image pairs within the database;
  providing, using one or more processors, at least a first image pair and a second image pair;
  wherein the first image pair is selected from a first database that stores image pairs, in which whether the image contents are same or not is known; and the second image pair is selected from a second database that stores image pairs, in which whether the image contents are same or not is unknown;
  obtaining, using one or more processors, a first answer and a second answer from the user, wherein the first answer and the second answer respectively indicate the user's determination on whether the image contents in the first image pair and the second image pair are same or not;
  determining, using one or more processors, the image contents in the second image pair being same in response to the weight of the second image pair reaching a predetermined weight;
  modifying a weight of the second image pair in response to the first answer matching a predetermined answer; and
  wherein the verification of each pair of images is enabled to be changed based on the modifying of the weight.

2. The method according to claim 1, wherein the providing at least the first image pair and the second image pair to the user comprises:
  providing at least the first image pair and the second image pair to the user in response to the user accessing a login page.

3. The method according to claim 2, further comprising:
  directing the user to another page associated with the login page in response to the first answer matching the predetermined answer.

4. The method according to claim 3, further comprising:
  performing again the method according to claim 1 in response to the first answer not matching the predetermined answer.

5. The method according to claim 2, wherein the method is provided independent of the login page.

6. The method according to any of claim 1, wherein:
  the first image pair and the second image pair are displayed at random.

7. The method according to claim 1, further comprising:
  removing the second image pair from a second database.

8. The method according to claim 1, wherein the image contents are any of articles, animals and figures.

* * * * *